United States Patent [19]

Marlett

[11] Patent Number: 4,702,662
[45] Date of Patent: Oct. 27, 1987

[54] TRAILER

[76] Inventor: Lloyd D. Marlett, R.D. #1 Box 200, Walton, N.Y. 13856

[21] Appl. No.: 747,571

[22] Filed: Jun. 24, 1985

[51] Int. Cl.⁴ .................................................. B60P 1/32
[52] U.S. Cl. ..................................... 414/477; 298/12; 298/14; 414/500; 414/482
[58] Field of Search ............... 414/480, 482, 473, 468, 414/477, 478, 479, 491, 494, 498, 500, 501, 537, 538, 559, 439; 298/12, 14

[56] References Cited

U.S. PATENT DOCUMENTS

| | | | |
|---|---|---|---|
| 2,621,814 | 12/1952 | Lisoth | 414/477 |
| 3,414,148 | 12/1968 | Bishop | 414/477 |
| 3,430,792 | 3/1969 | Grove et al. | 414/477 |
| 3,485,400 | 12/1969 | Pewthers | 414/477 |
| 4,456,420 | 6/1984 | Newhard | 414/477 X |
| 4,529,349 | 7/1985 | Lutz | 414/478 |
| 4,548,541 | 12/1985 | Corompt | 414/479 |

FOREIGN PATENT DOCUMENTS 260213  5/1964  Australia .............................. 414/480

Primary Examiner—Frank E. Werner
Attorney, Agent, or Firm—Barry L. Haley

[57] ABSTRACT

A utility trailer especially suited for transporting an automobile having a vehicle carriage that is reciprocally moveable to longitudinally and tiltable relative to the trailer frame to provide a shallow ramp for loading and unloading the vehicle. The trailer includes a self contained gasoline powered engine for driving a hydraulic fluid actuated system for controlling the position of the moveable carriage and a winch. The trailer includes a stop bar to prevent movement of the trailer during loading and unloading. The carriage is a rigid flat platform connected to an auxiliary frame that is pivotally connected to the main trailer frame. The carriage can be moved parallel to the auxiliary frame by the hydraulic actuator.

5 Claims, 6 Drawing Figures

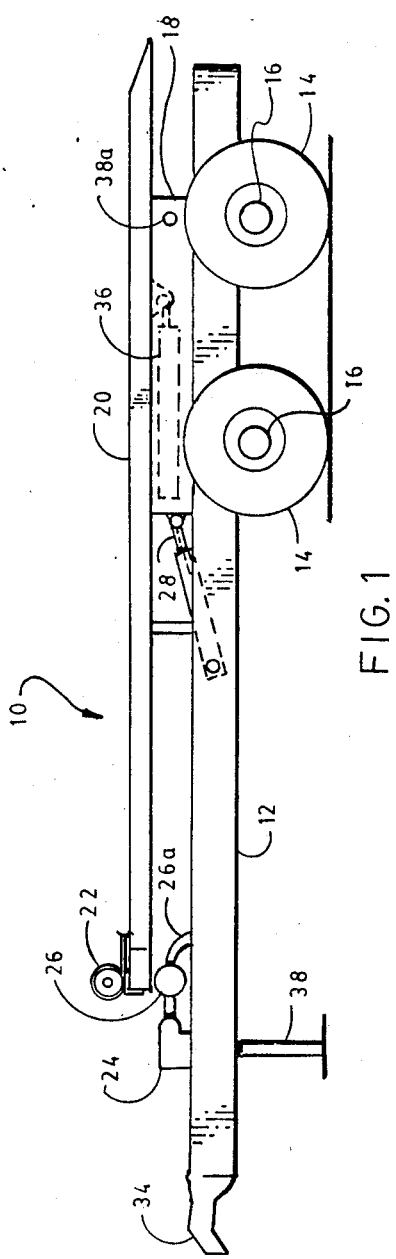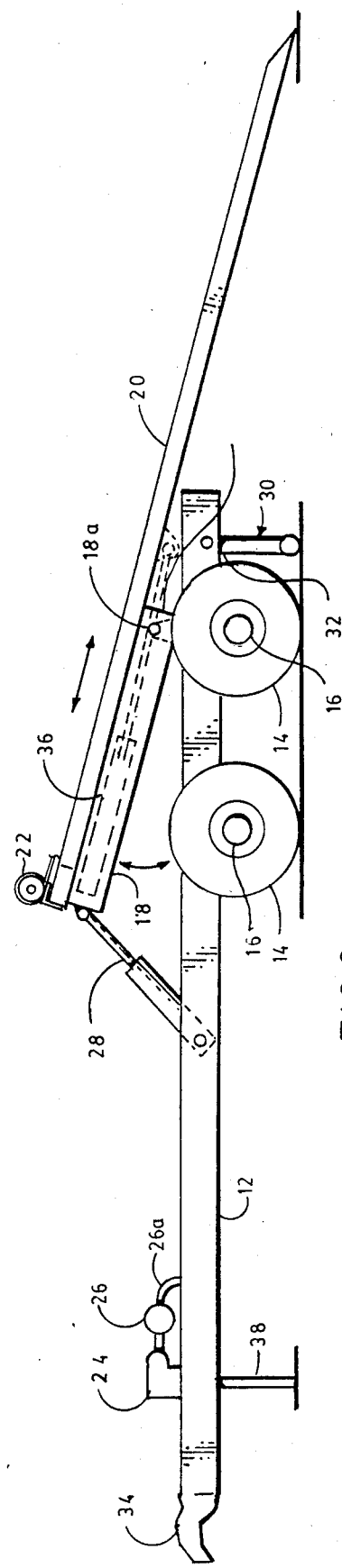
FIG. 1
FIG. 2

TRAILER

BACKGROUND OF THE INVENTION

This invention relates generally to an improved utility trailer for hauling vehicles behind a car or truck, and specifically to a utility trailer that has a moveable vehicle carrier that can be positioned horizontally and angularly relative to the ground in order to provide a shallow angle for loading or unloading a vehicle. The trailer includes self-contained, hydraulic powered actuators for pivoting and moving the carrier longitudinally relative to the main trailer frame. A braking bar can be moved to engage the ground during loading or unloading to prevent movement of the trailer.

Towing dollies and trailers are shown in the prior art for the purposes of towing or transporting a disabled automobile The primary advantage of such units is to permit transport of a disabled vehicle with a conventional car or truck, eliminating investment in an expensive, single purpose vehicle such as a tow truck.

Generally the towing dollies have been unsatisfactory because the disabled vehicle must keep either front or rear wheels on the road resulting in a three vehicle towing combination that can be unstable and difficult to maneuver when backing up.

Trailers having a rigid, fixed flat bed must include some type of additional ramp that is often too steep or not sturdy for loading or unloading a disabled vehicle. A vehicle ambulance is disclosed in U.S. Pat. No. 3,674,167 that includes a pivotal ramp assembly at the rear end of the main support.

Many of the prior art units must rely for operation on the electric or hydraulic power of the primary vehicle used to tow the dolly or trailer, most often requiring special modification to the primary vehicle.

The present invention overcomes the problems of the prior art by providing a utility trailer that has a rigid vehicle carrier that can be positioned independently both longitudinally and pivotally relative to the main trailer frame to ensure a shallow loading angle relative to the ground to permit safe loading and unloading of a vehicle. A winch coupled to the carrier is used to pull the vehicle onto the carrier. The trailer includes self contained hydraulic actuators for moving the carrier both longitudinally and pivotally. The use of an auxillary frame to support the carrier makes the trailer especially durable, stable and safe for supporting the weight of a conventional automobile The hydraulic actuators also lock the carrier in position relative to the main frame during transport of the load. In addition a safety locking pin is used to lock the carrier relative to the frame.

A ground engaging trailer stop is pivotally connected to the main frame to prevent movement of the trailer during loading or unloading.

SUMMARY OF THE INVENTION

A trailer especially suited for transporting a disabled vehicle, said trailer having a main rigid support frame, at least one axle connected to said main frame including a pair of wheels connected to the axle, an auxillary frame mounted on top of the main frame and pivotally connected at one end to said main frame, and a rigid flat carrier mounted on said auxillary frame.

The main frame is comprised of steel beams joined together to form a substantially rectangular, flat structure having lateral support members. The forward end of the main frame has rigid support members joined angularly at one end terminating in a socket suitable for attachment to a trailer ball hitch mechanism mounted at the rear of the vehicle to be used for towing the trailer. The forward end of the main frame includes a small platform upon which a gasoline engine and hydraulic pump are mounted. The engine drives the pump to provide hydraulic fluid pressure to actuators described below.

The auxillary frame is comprised of rigid steel beams joined together to form a rectangular frame smaller than the main frame and including lateral support members. The auxillary frame is mounted pivotally at its back end to a bar rigidly attached to the main frame near the rear of the trailer main frame.

A first hydraulic actuator that includes a piston and actuating arm is connected at one end to the main frame and at the opposite end to the forward end of the auxillary frame. The first actuator connected by fluid lines to the hydraulic pump can be controlled by suitable hydraulic controls to move the auxillary frame from a position parallel to the main frame to an angle (approximately 25) relative to the main frame.

The vehicle carrier is a flat rigid platform that can support a conventional automobile and is coupled parallel to and on top of the auxillary frame by slideably engaged rails. The carrier is moved longitudinally relative to the auxillary platform by a second hydraulic actuator mounted in the plane of the auxillary frame. The carrier and auxillary frame move by action of the hydraulic actuators so that the rear end of the carrier engages the ground in one position at a shallow angle for loading or unloading of a vehicle.

At the rear of the main frame, a braking bar is pivotally attached and may be hydraulically actuated to engage the ground to prevent movement of the trailer.

To operate the trailer in order to transport a disabled vehicle, the gasoline engine is started, driving a hydraulic pump that powers the first and second actuators and the braking bar actuator. The second actuator moves the carrier in a rearward direction extending the carrier over the rear of the main frame. After full extension of the carrier rearwardly, the auxillary frame is pivoted, causing the carrier to move from a position horizontal to the ground to a shallow angle with the ground until the rear edge of the carriage engages the ground. The braking bar is pivoted into engagment with the ground to prevent movement of the trailer.

A winch and cable is attached to the disabled vehicle and the vehicle is pulled onto the carrier and anchored to the carrier.

The carrier is then moved to its most forward position by the second hydraulic actuator. The auxillary frame is lowered and locked hydraulically and with a pin in a horizontal position. Once the braking bar is raised, the trailer is ready to transport the vehicle.

The operation is reversed for unloading the disabled vehicle.

Other objects can be transported on the trailer and are easily loaded using the shallow angle of the carriage.

It is an object of this invention to provide an improved utility trailer especially suited for transporting vehicles.

It is another object of the invention to provide an improved utility trailer having a moveable carrier that can be moved from a horizontal position to a shallow, angular position relative to the ground for loading and unloading.

And yet another object of this invention is to provide a utility trailer of non-complex construction that includes a self-contained hydraulic actuating unit to move the carrier and a braking bar.

And yet still another object of the invention is to provide a sturdy, safe trailer for transporting a vehicle such as an automobile that includes a main frame, a pivotable auxillary frame and a carrier of unitary construction moveably coupled to the auxillary frame that acts as both the vehicle support and the ramp for loading or unloading.

BRIEF DESCRIPTION OF THE DRAWINGS

FIG. 1 is a side elevational view of the present invention with the carrier in the transport position.

FIG. 2 is a side elevational view of the present invention with the carrier extended rearwardly and tilted for loading and unloading a vehicle.

PREFERRED EMBODIMENT OF THE INVENTION

Figure 5:
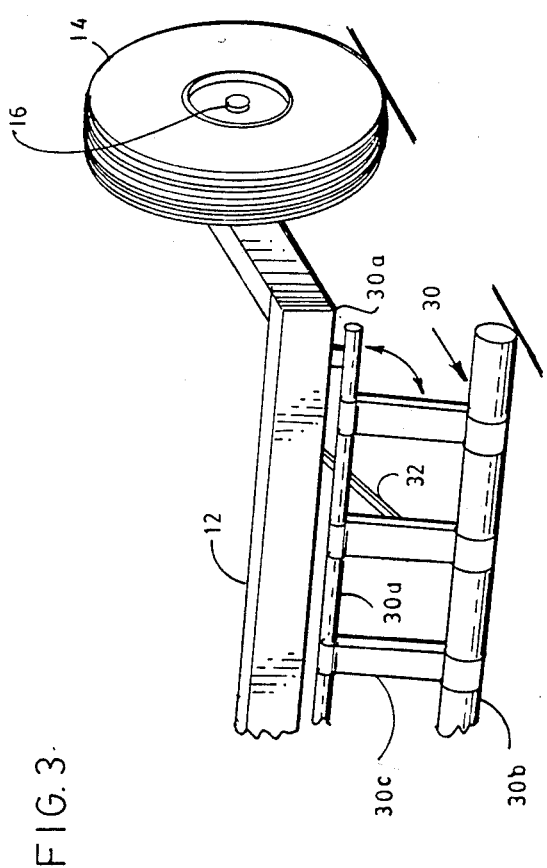
FIG. 5 is a cut away perspective view of the braking bar attached to the rear of the trailer.

Referring now to FIG. 1, the invention is shown generally as trailer 10 having a main rigid frame 12 attached to wheels 14 by axles 16. An auxillary frame 18 is pivotally connected in the rear by bar 18a attached to mounting plates 12a affixed to main frame 12. A carrier 20 is connected to and mounted on auxillary frame 18. A gasoline engine 24 drives hydraulic pump 26, both of which are mounted on the forward end of frame 12. Hydraulic lines 26a supply hydraulic fluid under pressure to three hydraulic actuators, described below. A powered winch 22 is mounted at the forward end of carrier 20 and is used to pull a vehicle onto the carrier 20. A conventional hitch socket 34 is mounted at the front of the trailer main frame 12 to permit connection to a ball hitch (not shown) on the towing vehicle. A rigid vertical support 38 which could include a wheel is used when the trailer 10 is not connected to a towing vehicle.

FIG. 2 shows the trailer 10 with carrier 20 extended rearwardly along the longitudinal axis of the main frame 12 and tilted at a shallow angle relative to the ground for ease in loading or unloading. The tilting action is achieved by the movement of auxillary frame 18 around pivot bar 18a connected to the main frame 12 by plates 12a due to hydraulic actuator 28, also attached at one end to main frame 12 and at the other end to the forward lateral member of auxillary frame 18. The carrier is sized in length and mounted longitudinally relative to the auxillary frame to ensure a shallow angle with the ground at full rear extension.

The longitudinal movement of carrier 20 is achieved by hydraulic actuator 36 connected to auxillary frame 18 and carrier 20, both of which are slideably coupled together. Actuator 36 includes a double action cylinder that allows movement or locking action between the carrier 20 and auxillary frame 18.

A braking bar 30 is pivotally attached to the rear of main frame 12 and has hydraulic actuator 32 coupled thereto for raising or lowering the braking bar 30. The braking bar 30 when engaged with the ground prevents movement of the trailer 10.

Figure 3:
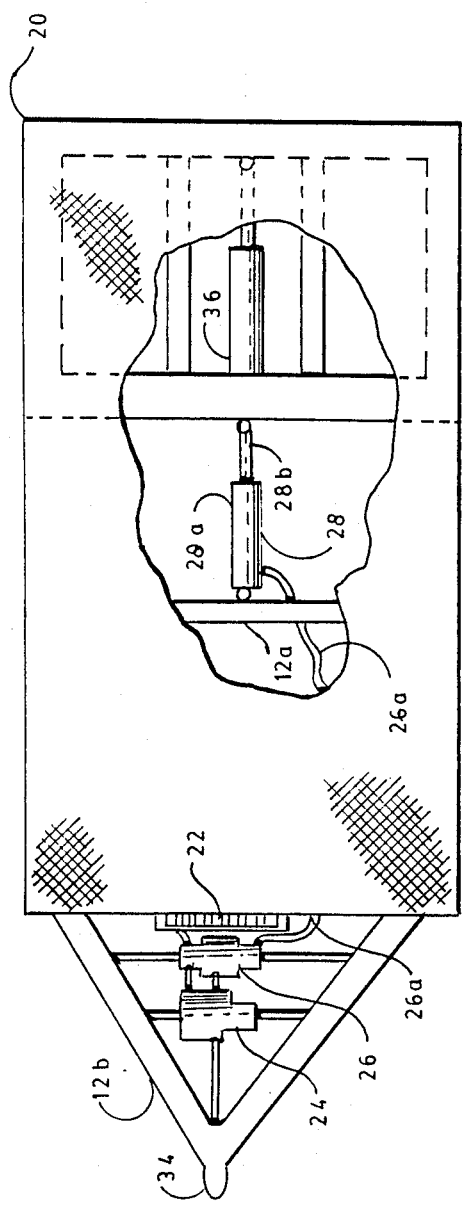
FIG. 3 is a top plan view of the present invention with the carrier partially cut away.

FIG. 3 shows the carrier 20 flat upper surface which can be sheet metal attached to a rigid rectangular frame having lateral support members (not shown). Beneath carrier 20 are actuators 28 and 36 that provide the tilting movement and the longitudinal reciprocal movement for carriage 20. Each hydraulic actuator includes a conventional cylinder such as 28a and an actuating arm 28b connected to a piston in cylinder 28a that receives hydraulic fluid under pressure through tubes 26a from pump 26. The actuating arm movements are controlled by conventional hydraulic controls (not shown).

Figure 4A:
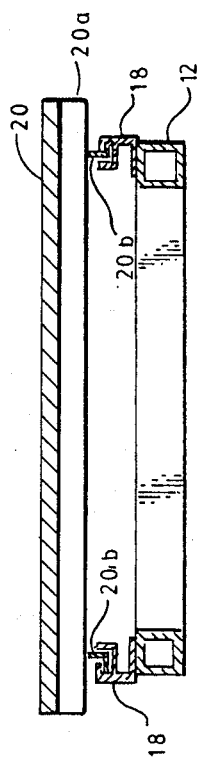
FIG. 4a is a front elevational view in cross section showing the main frame, the auxillary frame, the carrier frame and cover.
Figure 4B:
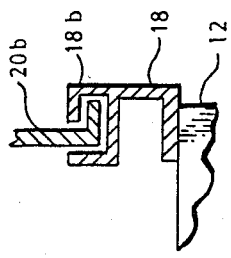
FIG. 4b is a front elevational cross section of the coupling of the carrier to the auxillary frame.

FIGS. 4a and 4b show the relationship between the auxillary frame 18 that is slideably coupled to carrier 20 having frame member 20a disposed laterally and mounting member 20b disposed longtudinally on each side for engagement with auxillary frame 18 that includes channel iron rails 18b that encompass the "L" shaped mounted member 20b. This connection prevents vertical and lateral separation of auxillary frame 18 and carriage 20 while permitting front-rear relative movement. Safety pins (not shown) may be used to lock the carriage 20 to auxillary frame 18.

FIG. 5 shows the braking bar 30 pivotally attached to bar 30d welded at 30a to main frame 12 at the rear of the trailer. Rigid support members 30c are connected to the ground engaging member 30b. The entire braking bar is pivoted into and out of engagement with the ground by hydraulic actuator 32 connected to main frame 12.

Because the rigid carrier functions both as the vehicle support platform and the loading ramp, the weight support capacity is maintained during all operations of the trailer including transport, loading and unloading. The use of the carrier with the auxillary frame as the loading ramp also permits a shallow angle to be achieved during loading or unloading.

What I claim is:

1. A utility trailer capable of being towed by a conventional automobile or small truck for transporting an automobile comprising:

a rigid primary supporting frame having a front end and a rearward end, said primary frame being substantially rectangular and including a pair of parallel, longitudinal side members, and a pair of parallel, laterally disposed end members connected to said longitudinal side members, said primary frame having attached there to first and second forward members angularly joined together at one end forming an apex and connected to the front end of the primary frame at their opposite ends;

at least one axle attached to said primary frame;

a pair of wheels rotatably connected to said axle;

trailer hitch connected to the apex of said first and second forward members connected to said front end of said primary frame for coupling said trailer to said conventional automobile or truck;

a rigid, substantially rectangular auxiliary frame having a front end and a rearward end and including a pair of parallel, longitudinally disposed side members, said auxiliary frame pivotally attached at its rearward end to said primary frame, said auxiliary frame longitudinal side members being supported on top of said primary frame side members whenever said auxiliary frame is parallel to said primary frame;

pivotal brake means connected at a rearward terminal end of the primary frame for engaging the ground to prevent movement of the trailer during loading or unloading;

a rigid, flat carrier coupled to said auxiliary frame and moveable in a longitudinal direction relative to said auxiliary frame;

means connected to said primary frame and at a forward terminal end of said auxiliary frame for pivotally moving said auxiliary frame; and means for moving said carrier longitudinally relative to said auxiliary frame;

said carrier being sized in length relative to said auxiliary frame and said primary frame that one end of the carrier engages the ground at a shallow angle suitable for loading or unloading a conventional automobile whenever the auxiliary frame is raised to its upper most pivotal position and the carrier is moved to its rear most position relative to the auxiliary frame.

2. A utility trailer as in claim 1, wherein said means for moving said carrier includes:
self contained motive hydraulic power source; and
first hydraulic actuating means connected to said auxillary frame, said carrier and said power source.

3. A utility trailer as in claim 1, wherein said means for moving said auxiliary frame includes:
second hydraulic actuating means connected to said primary frame, said auxillary frame, and said power source.

4. A utility trailer as in claim 1, including:
a self powered winch mounted at the front end of said carrier for pulling a disabled vehicle onto said carrier.

5. A utility trailer as in claim 1, including:
carrier mounting rails connected to the bottom of said carrier and disposed in a longitudinal direction relative to said trailer longitudinal axis; and
auxillary frame rails engaged with said carrier rails to slideably couple said carrier to said auxiliary frame.

* * * * *